United States Patent
Street

(10) Patent No.: US 6,763,145 B1
(45) Date of Patent: Jul. 13, 2004

(54) METHOD AND APPARATUS FOR LENTICULAR IMAGING

(76) Inventor: Graham S. B. Street, Impstone House, Pamber Road, Silchester, Reading, Berkshire (GB)

(*) Notice: Subject to any disclaimer, the term of this patent is extended or adjusted under 35 U.S.C. 154(b) by 0 days.

(21) Appl. No.: 09/564,849

(22) Filed: May 4, 2000

(30) Foreign Application Priority Data

Nov. 8, 1997 (GB) .............................................. 9723591

(51) Int. Cl.[7] .............................. G06K 9/00; G06K 9/40
(52) U.S. Cl. ....................................... 382/275; 382/151
(58) Field of Search ................................. 382/144, 151, 382/199, 200, 263, 275; 359/19, 196, 237, 362, 443, 450, 455, 458, 462, 463, 577, 641

(56) References Cited

U.S. PATENT DOCUMENTS

| | | | | |
|---|---|---|---|---|
| 4,346,962 A | * | 8/1982 | Holmes, Jr ................. | 359/463 |
| 5,132,839 A | * | 7/1992 | Travis ........................ | 359/462 |
| 5,349,419 A | * | 9/1994 | Taguchi et al. ............... | 355/22 |
| 5,424,553 A | * | 6/1995 | Morton ....................... | 250/548 |
| 5,661,599 A | * | 8/1997 | Borner ........................ | 359/463 |
| 5,708,528 A | * | 1/1998 | Furuya ....................... | 359/457 |
| 5,724,188 A | * | 3/1998 | Kumagai et al. ........... | 359/619 |
| 5,825,541 A | * | 10/1998 | Imai ............................ | 359/464 |
| 5,835,194 A | * | 11/1998 | Morton ....................... | 355/22 |
| 5,838,494 A | * | 11/1998 | Araki .......................... | 359/455 |
| 5,959,718 A | * | 9/1999 | Morton ....................... | 355/22 |
| 6,211,896 B1 | * | 4/2001 | Morton ....................... | 347/225 |

FOREIGN PATENT DOCUMENTS

| | | | |
|---|---|---|---|
| EP | 0 713 120 A1 | 5/1996 | .......... G02B/27/22 |
| EP | 0 743 552 A1 | 11/1996 | .......... G03B/35/14 |
| EP | 0 801 321 A1 | 10/1997 | .......... G03B/35/24 |
| WO | WO 99/24862 | 5/1999 | .......... G02B/27/22 |

OTHER PUBLICATIONS

International Search Report, dated Jan. 28, 1999 for PCT/GB 98/03308.

* cited by examiner

Primary Examiner—Andrew W. Johns
Assistant Examiner—Amir Alavi
(74) Attorney, Agent, or Firm—Birch, Stewart, Kolasch & Birch, LLP

(57) ABSTRACT

A method and apparatus for the production of an autostereoscopic and/or animated image on a lenticular screen is provided. In order to achieve the required accuracy for a good lenticular image, a detector is used to measure the location of an edge of the image bearing substrate and image data is positioned relative to this edge. The substrate may be a conventional print medium for subsequent attachment to the lenticular screen or the screen itself. As an alternative to the edge of the substrate, the lens elements of the screen can provide the frame of reference for accurate registration of the image. This is achieved by viewing a defined reference grid through the lenticular screen and converting the observed Moiré pattern into data suitable for positioning the elements of the required image, thereby accommodating dimensional variations within the screen.

13 Claims, 4 Drawing Sheets

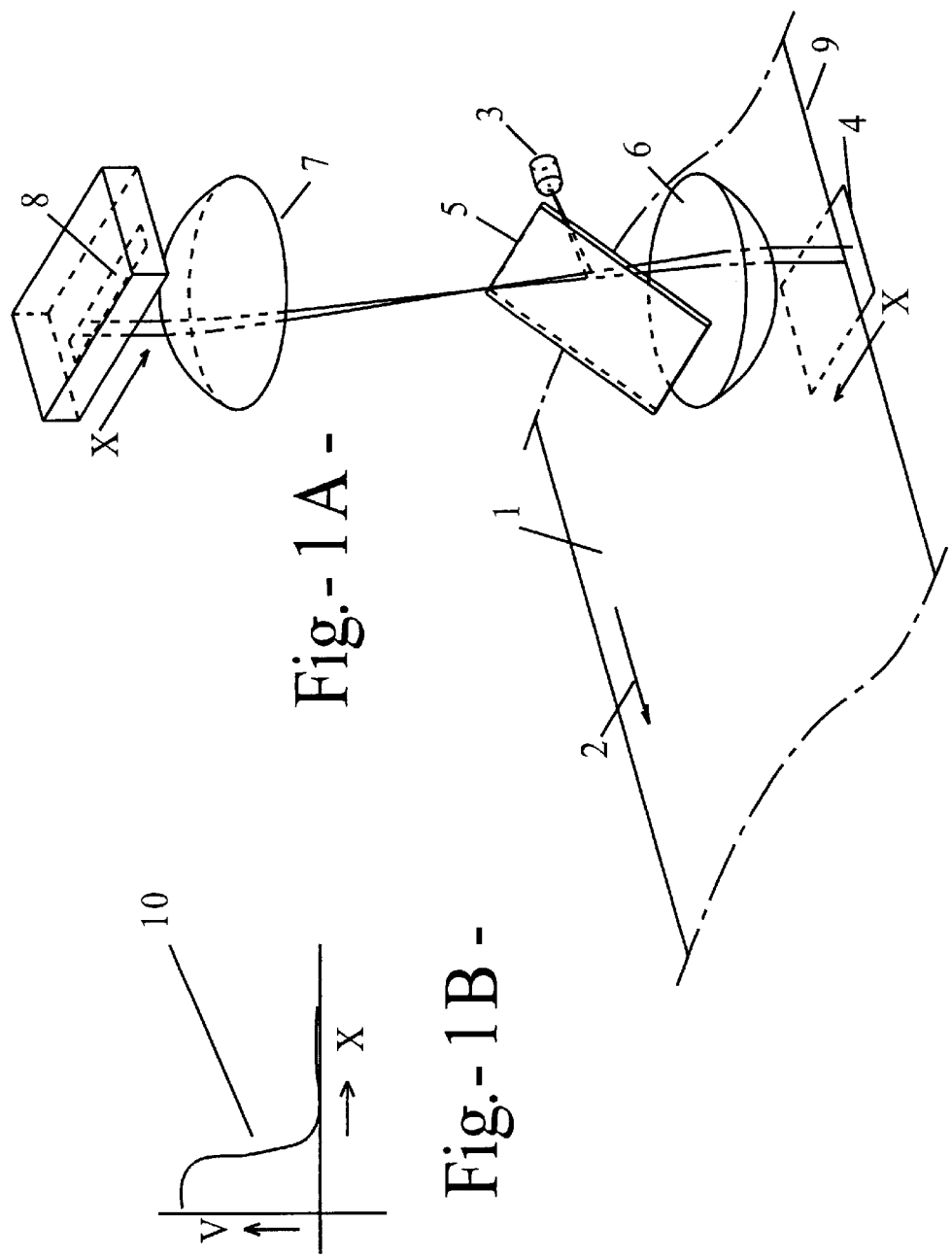
Fig.-1A-
Fig.-1B-

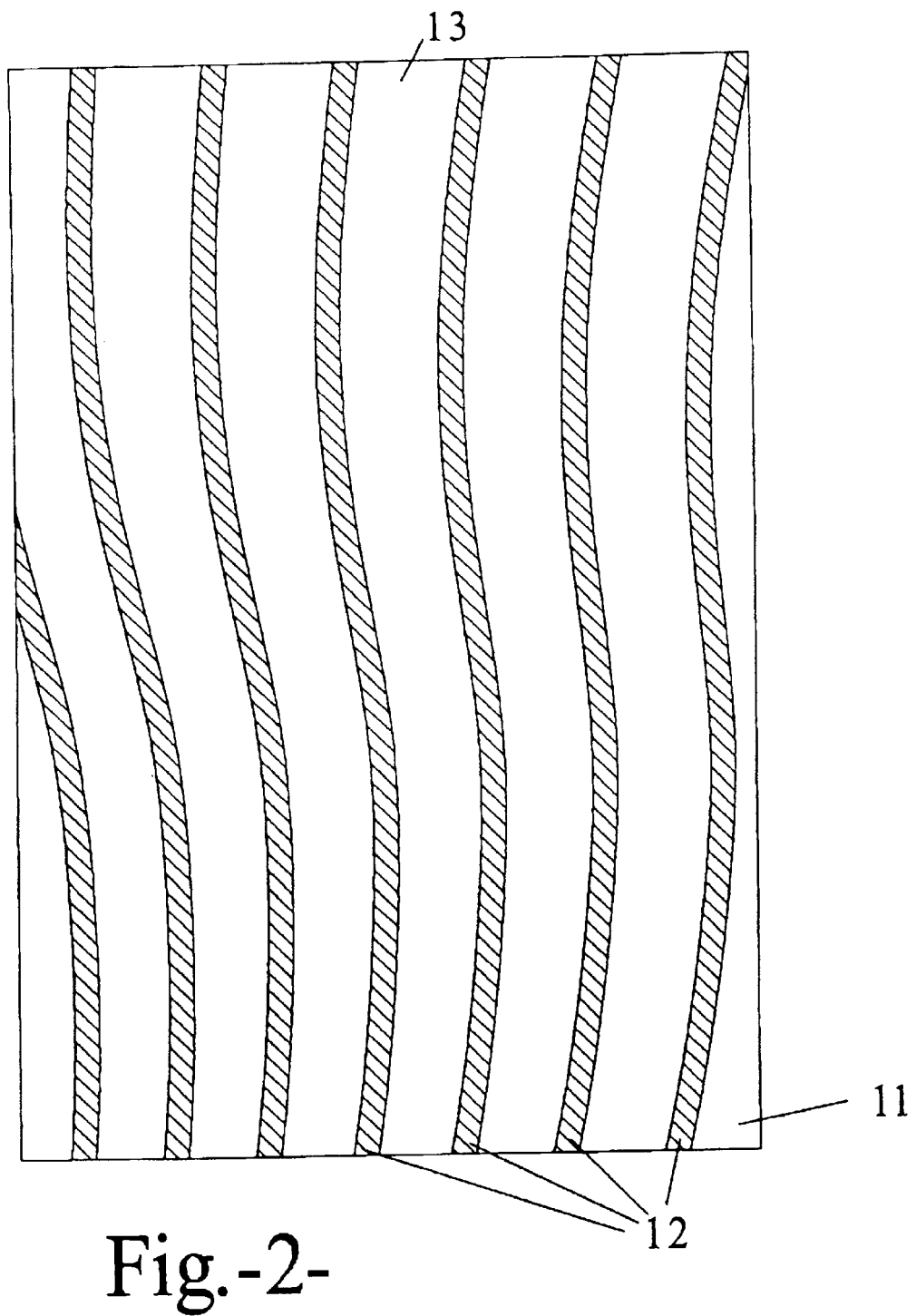
Fig.-2-

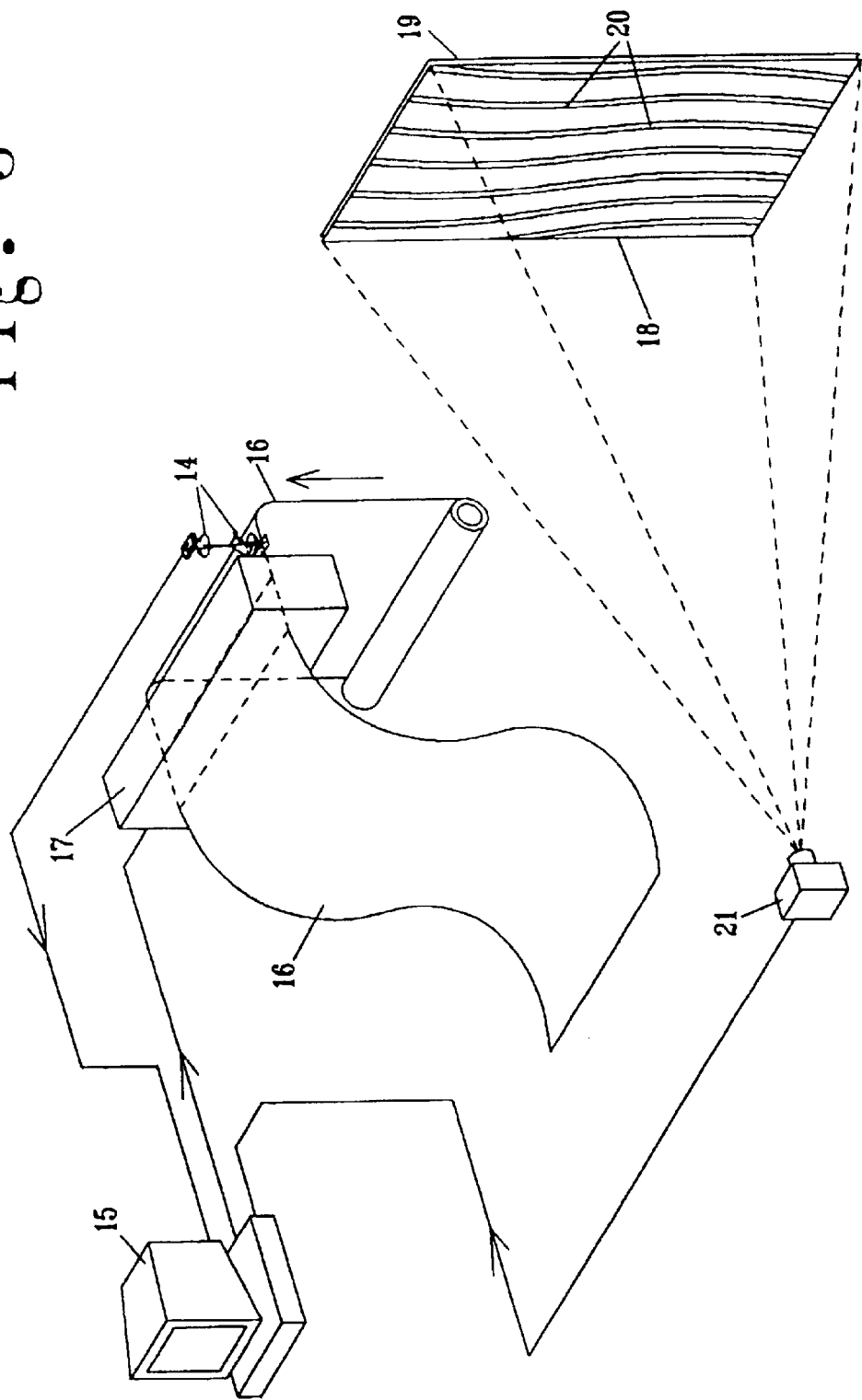
Fig.-3-

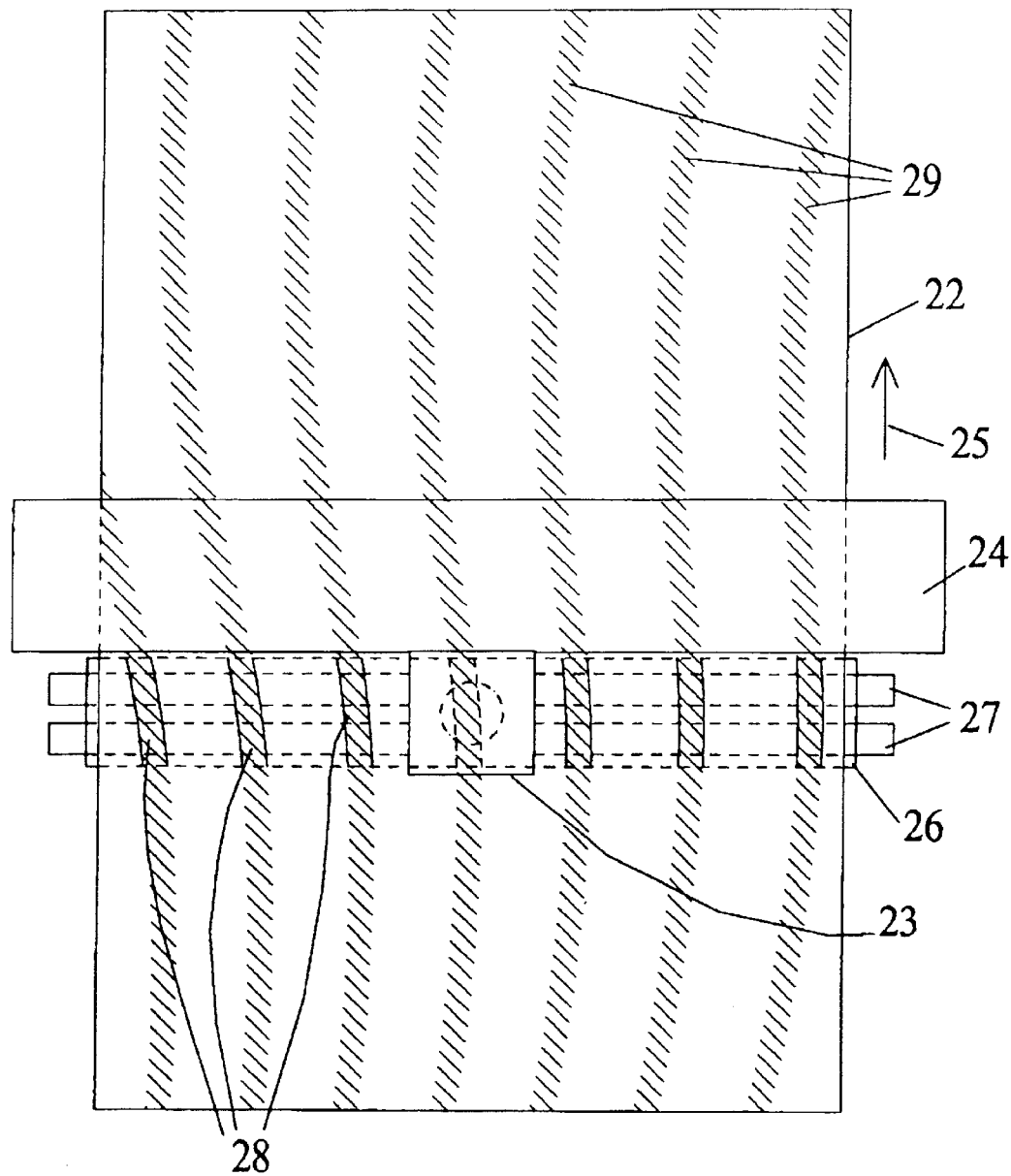
Fig.-4-

METHOD AND APPARATUS FOR LENTICULAR IMAGING

This invention is concerned with the field of lenticular imaging and, in particular, with the provision of autostereoscopic or animated images where different views of an object field are provided, the view or views which are seen being selected according to the observer's viewpoint.

BACKGROUND

It is a well established principle of lenticular imaging that information or image data be positioned in precise registration with and at the focal plane of a regular array of lens elements comprising a lenticular screen. Typically, these lenticular elements or lenticles are part cylindrical in form and have their axes running vertically. An observer views the image through the lenticular screen and, as his point of view changes, sees a different portion or aspect of it. In this way, it is possible to provide three-dimensional images, in which each eye sees a slightly different aspect of the same scene, as well as animated sequences and the like.

As it is a requirement for good lenticular images that the registration of image data be extremely precise relative to the longitudinal axis of each corresponding lenticle, it is normally both a requirement that the lenticular array have a totally constant and known pitch and also that the picture elements or pixels positioned behind it be printed with corresponding accuracy. This requirement imposes a cost penalty on the lenticular screen and assumes substantial precision from the printing process.

In Patent Application EP 0 801 324 A1 (Morton et al.) apparatus is described in which the magnification and registration of an integral composite image to a lenticular substrate, in order to provide a viewable lenticular image, is controlled by the provision of reference patterns. These reference patterns are widely spaced from each other and provide the necessary data to alter the scale, rotation and position of the integral image so that this can be made to match a regular lenticular array. The problems of image alignment are also addressed by U.S. Pat. No. 5,424,553 (Morton et al.). Neither of these documents addresses the problem of accommodating non-uniform distortions within the lenticular material, which would render simple magnification and alignment inadequate to provide a high quality lenticular image. In such a case a more general error correction mechanism is required, in which a contiguous map of errors covering the entire image area is needed. The generation of such a map and its use to rectify such general distortions is the subject of this invention.

SUMMARY OF THE INVENTION

It is an object of the current invention to ensure that the precision of the printed image matches the geometry of the lenticular screen in combination with which it is to provide a good three-dimensional or animated image.

It is another object of the current invention to provide good lenticular images without the need to use a highly accurate array of lens elements, thus reducing the cost of the final product.

It is a further object of the invention to accommodate scale differences between different lenticular screens.

It is also an object of the invention to print in register with a lenticular screen without the need for manual intervention.

Thus, according to one aspect of this invention, means is provided for the production of a lenticular image or a component thereof, comprising means for detecting the position of at least one reference line associated with and/or an edge of an image bearing substrate, whereby, in use, an element of said image on said substrate is positioned relative to said at least one line and/or edge.

Preferably, the image bearing substrate comprises a sheet of print media.

The image bearing substrate may comprise a lenticular screen having juxtaposed elongate cylindrical lens elements on a first side and a second side which is image bearing.

The at least one line comprises, in use, a portion of a Moiré pattern formed by the combined action of the lenticular screen with a reference grid comprising an array of light blocking or absorbing regions.

In a preferred embodiment of the invention, image elements are printed directly onto the second side of the lenticular screen.

According to a further aspect of the invention the detection means comprises a collimated source of light arranged to illuminate an area which includes, in use, a portion of an edge of the image bearing substrate. Typically, the source provides infrared light.

Advantageously the illuminated area comprises retro-reflective means partially obscured, in use, by the edge of the substrate which is positioned intermediate the source and the retro-reflective means.

According to another aspect of the invention the detection means includes a mask comprising an interleaved array of light blocking and transmitting regions positioned at the focal plane of the lens elements of the lenticular screen and means for viewing, at a location remote from said screen on the side of said screen opposite to that of said mask, the modulation pattern resulting from the combined action of said screen with said mask. Means is provided for converting this modulation or Moiré pattern into an error map.

Preferably the viewing means comprises a CCD camera. The Moiré pattern, produced by positioning a grid behind the lenticular screen, is captured in digital form and the deviations relative to the lines of said grid of the longitudinal axes of the lens elements of the lenticular screen are computed therefrom.

DESCRIPTION OF PREFERRED EMBODIMENTS

The invention will now be described with reference to FIGS. 1A to 4 in which:

FIGS. 1A and 1B, collectively referred to herein as FIG. 1 illustrate apparatus in accordance with the invention for detecting the lateral position of the edge of a substrate as this passes through the detector assembly, FIG. 2 illustrates how the distortions of a lenticular screen may be determined in accordance with the invention for subsequent use in providing an undistorted lenticular image, FIG. 3 shows, in diagrammatic form, a complete printing system constructed in accordance with the invention.

FIG. 4 illustrates a system constructed in accordance with the invention for printing directly onto lenticular material.

In FIG. 1A a substrate 1 in the form of back lit opalescent film, a typical example of a conventional print medium, is advanced in a direction indicated by arrow 2, as part of a sequential (line-by-line) printing process. The horizontal position of the image to be printed is registered with reference to the edge of substrate 1 instead of the printer's chassis (illustrated in FIG. 3 below), thus eliminating the inaccuracies introduced by lateral creep in the printer's paper/film advance mechanism. This registration is achieved as follows.

An infrared LED 3 illuminates a retro-reflective patch 4 to such extent as this is not obscured by substrate 1. The infrared light from LED 3 reaches patch 4 via a partially transparent mirror 5 and is collimated by lens 6. Light from the illuminated area of patch 4 is returned and some of this passes through mirror 5 to be recollimated by lens 7, prior to impinging on a linear CCD array 8. When CCD 8 is read out, it provides a signal 10 of the form illustrated in FIG. 1B. This directly converts into a measure of the lateral position X of the edge 9 of substrate 1. If the plane of substrate 1 is at the focal plane of lens 6, CCD 8 is at the focal plane of lens 7 and the focal lengths of both lenses are equal, then the scale of the image formed on the CCD is exactly equal and opposite in direction to that of the object plane at the edge of substrate 1. Other ratios are possible, if a magnification factor is desirable. In order to print a pattern, which is laterally positioned relative to the edge 9 of its substrate 1 with great precision, the output from CCD 8 is used to position image data relative to the coordinates of the detector assembly, itself attached to the printer mechanism, offset by an amount equating to the change in position X of the substrate's edge, located with CCD 8.

The arrangement of FIG. 1 provides the necessary control to print image data with great lateral precision relative to its substrate. Provided the lenticular screen itself is free of distortions and the scale of the image printed correctly matches the pitch of the screen, this combination, when correctly registered, will provide a good lenticular image. However, in order to reduce the manufacturing cost of lenticular material, it is often desirable to use techniques such as extrusion, which typically introduce dimensional variations within the finished product. These variations appear as a lack of straightness and variations in lenticular lens pitch. The current invention provides a method for avoiding the severe degradation in lenticular image integrity which would normally result from such defects.

The apparatus of FIG. 1 can be used to print a very precise reference grid, comprised of vertical lines. This is then positioned behind a target lenticular screen comprising an array of cylindrical lens elements having a slightly larger or smaller pitch. The observed result is a Moiré pattern, having the same mark-to-space ratio as the reference grid. If the lenticular array has no distortions then a set of straight parallel lines will be observed. If its pitch varies or the lens elements are not straight, irregular behaviour will be observed.

FIG. 2 illustrates a typical pattern which might be produced. In this particular example, black lines having a width approximately one quarter of their pitch are positioned behind a screen with a slightly larger lens pitch. At the bottom 11 of the pattern dark fringes 12 are formed at a pitch which shows that the actual lens structure has about seven fewer lens elements than the reference grid has lines. At the top 13, the difference is approximately five and one half. At any point in-between, the lens pitch changes and there is also a variation in the position of the lenses corresponding to approximately one third of the lens pitch. In mathematical terms, this may be expressed as a phase error and the pitch change as a change in wavelength. The function of the reference grid is to heterodyne the higher spatial frequencies of the lenticular screen into a low frequency field which contains precise information about residual scale errors and screen distortions. Because the errors in position of the elements of a lenticular screen will typically vary slowly from point to point and the Moiré pattern generated in accordance with the above description is consequently a relatively coarse one, it is well suited for capture by a conventional CCD camera. It can then be converted into the required corrections which must be applied to the positioning of the image data in the printed pattern. Once applied, the resulting print will precisely match the lenticular screen from which the pattern was derived. In outline, this correction process may be defined as follows. For each fringe of the Moiré, the position of image data at that location must be adjusted by one pitch of the reference grid, relative to the grid as a coordinate system, in order to be in register with the lenticular screen. By using the vertical centre line of the screen, in the example of FIG. 2, this means a shift of 3.5 grid pitches outwards in each corner at the bottom of the screen, 2.5 grid pitches outwards for the top right corner and 3 grid pitches outwards for the top left corner. There will also be a change in shift of up to about half a pitch at points in between the top and bottom, because of the wavy nature of the Moiré.

A full printing system, incorporating both print-to-substrate registration and lenticular screen correction, is illustrated in FIG. 3. Firstly, edge detection means 14, constructed in accordance with the principles described with reference to FIG. 1, is used to feed a computer 15 with a stream of horizontal edge position data for the substrate 16 relative to an ink jet printing system 17. This data is used to ensure that computer 15 correctly positions image data on substrate 16, although the substrate's lateral position as it passes through printer 17 may be ill defined. Secondly, in order to cater for the distortions in the lenticular screen 18 intended for use with the printed image, a precise grid 19 comprising vertical parallel lines is produced at a pitch slightly smaller (or larger) than that of the lenticular screen 18. This is placed in contact with screen 18 and a Moiré pattern 20 is produced. Viewed with a CCD camera 21, the image of the Moiré pattern, as seen from the location of camera 21, is captured with the aid of a frame grabber within computer 15 and, by combination of the error information extracted from this pattern with the data provided by edge detector 14, a fully corrected image is produced on substrate 16. Inherently, this procedure corrects for minor scale changes in the lenticular screen, as well as distortions of a more general nature.

It can be desirable to construct apparatus in accordance with the teachings of this invention in which image data is printed directly onto the image bearing surface of a lenticular screen. FIG. 4 shows, in elevation, apparatus to accomplish this. A lenticular screen 22, with its lens elements facing towards a CCD camera 23, is arranged to pass through a printing station 24 in the direction indicated by arrow 25. Immediately prior to the point of entry, a reference grid 26, backed by a suitably extended light source 27 is positioned in a fixed relationship to printer 24 and at or close to the focal plane of the lens elements of screen 22. This causes camera 23 to see a Moiré 28 (shown lightly hatched has an entire pattern 29 for the purpose of clarity but only produced within the area of reference grid 26, at any one time) just prior to the portion of the lenticular screen 22 corresponding thereto being printed upon by printer 24. As before, the pattern of the Moiré, once captured as binary data for processing by a suitable computer, provides all the information necessary to position all the relevant image data with great lateral precision with respect to each corresponding lenticular element.

It will be apparent to those versed in the art that other combinations of the principles described above may be applied to achieve the desired result. For instance, the edge of a highly accurate lenticular screen may be precisely registered with reference to its elements and the principles of FIG. 1 applied in isolation to print data in register therewith. It would also be quite possible to use lenticular screens which are not designed to be uniform, having, for instance, variable pitch and/or tilted lenticular elements. The reference grid should be produced with similar geometry, so that the deviations are small and the Moiré easy to capture and interpret.

Whilst this invention's prime purpose is to produce highly accurate printed images for use with a lenticular screen, the apparatus of FIG. 1 can produce a conventional image with vanishingly small lateral error. This will be of importance when producing overlays or tiled prints where a precise match between different layers or adjacent tiles is required.

What is claimed is:

1. Apparatus for the production of a lenticular image or a component thereof, comprising:
    a lenticular screen to form part of the lenticular image and including a lens array of substantially cylindrical lens elements having a focal plane;
    an image bearing surface at said focal plane;
    a reference array and
    an image capture device,
   wherein
    the lens array is non-uniform;
    the reference array is positioned substantially at the focal plane of the lens elements and the image capture device includes means for capturing a single contiguous image formed by the combination of the lens array and the reference array, and
        means for generating from the captured image a substantially contiguous error map which includes deviations for substantially the whole lens array and provides, in use at any given location on said lens array, a measure of the deviation of a respective cylindrical lens element from a corresponding element of the reference array,
    whereby the image content which is provided at the image bearing surface at the focal plane is displaced by the measure of deviation of its corresponding lens element at each respective point thereof, so that the image content is pre-distorted at each point to compensate for the deviations and is brought into alignment with said non-uniform lens array, at substantially all points thereof, so that, in use, the lenticular image is an undistorted lenticular image.

2. Apparatus as claimed in claim 1 in which the reference array a includes a mask which substantially covers the full width of the lens array and comprises an interleaved array of light blocking and transmitting regions and the image capture device is arranged to view, at a location remote from the lens array on the side of the lens array opposite to that of said mask, a modulation and/or Moiré pattern resulting from the combined action of the lens array and the mask.

3. Apparatus as claimed in claim 2 in which the image capture device comprises a CCD camera.

4. Apparatus as claimed in claim 2 in which the image capture device includes means for converting the modulation and/or Moiré pattern into the error map.

5. Apparatus as claimed in claim 1, which includes means for detecting the position of an edge of an image bearing substrate, in which the detection means comprises a collimated source of light arranged to illuminate an area which includes, in use, a portion of the edge of said image bearing substrate, whereby, in use, the content of the image on said substrate is positioned relative to said edge.

6. Apparatus as claimed in claim 5 in which the illuminated area comprises retro-reflective means partially obscured, in use, by the edge of the substrate which is positioned intermediate the source and the retro-reflective means.

7. Apparatus as claimed in claim 6 in which a partially transparent mirror provides a CCD array with an image of the illuminated area, whereby the position of the edge of the substrate is detected.

8. Apparatus as claimed in claim 7 in which the light is infrared light.

9. A method for producing a lenticular image or a component thereof, comprising:
    arranging a non-uniform array of substantially cylindrical lens elements to provide a lenticular screen having a focal plane;
    positioning a reference array of light blocking elements substantially at said focal plane;
    positioning an image capture device to view the reference array through the lens array;
    capturing with the image capture device a single contiguous image formed by the combination of the lens array and the reference array;
    computing from the captured image a substantially contiguous error map to include deviations for substantially the whole lens array and providing, at any given location on said lens array, a measure of the deviation of a respective cylindrical lens element from a corresponding light blocking element of the reference array;
    providing an image bearing surface for the lenticular image; and
    displacing the image content at the image bearing surface of the lenticular image by a distance corresponding to the measure of the deviation at each respective position of its corresponding lens element and, thereby, pre-distorting the content at each point to compensate for the deviations, aligning said content with said non-uniform lens array, at substantially all points thereof, and providing an undistorted lenticular image.

10. The method of claim 9 in which the computing step includes mapping the deviations from the elements of the regular reference array of the longitudinal axes of the respective lens elements juxtaposed on the first side of the lenticular screen; and the displacing step includes incorporating said deviations in the positioning, on the second side of said screen, of the image content corresponding to said respective lens elements.

11. The method of claim 9 in which the capturing step includes capturing a digital image of said single contiguous image; and the computing step comprises computing from said contiguous image the lateral deviations of the longitudinal axes of the lens elements of the lenticular screen relative to the corresponding elements of said reference array.

12. The method of claim 9 in which the single contiguous image includes a Moiré pattern.

13. An article comprising a lenticular screen and an associated error map for the production of an undistorted lenticular image produced by the method of claim 9.

* * * * *